(12) United States Patent
Maddox et al.

(10) Patent No.: US 6,306,468 B1
(45) Date of Patent: Oct. 23, 2001

(54) METAL TUBE COATING PROCESS

(75) Inventors: John W. Maddox; Brian L. Maddox, both of Houston; Michael E. Winters, Spring, all of TX (US)

(73) Assignee: Polymeric Processes Inc., Houston, TX (US)

( * ) Notice: Subject to any disclaimer, the term of this patent is extended or adjusted under 35 U.S.C. 154(b) by 0 days.

(21) Appl. No.: 09/512,868

(22) Filed: Feb. 25, 2000

(51) Int. Cl.$^7$ .......................................................... C08J 7/18
(52) U.S. Cl. .......................... 427/500; 427/299; 427/551; 427/595
(58) Field of Search .................................... 427/500, 551, 427/595, 299

Primary Examiner—Bernard Pianalto

(57) ABSTRACT

This invention teaches that the use of electron beam equipment and modified acrylic unsaturated coating compositions for free radical curing will reduce energy consumption for coating the exterior surface of tubing. The faster rate of polymerization of this coating composition allows for the replacement of a conventional oven or induction heater unit with an electron beam unit requiring much less floor space and generating much less heat. Pigmented coatings formulated according to this invention can be cured with an electron beam more efficiently than light radiation equipment and will meet the commercial coating requirements established by tube coaters. The application of the above specified type liquid coatings involves reduced maintenance costs and labor to operate as compared to powder coating systems and light radiation curing equipment.

13 Claims, No Drawings

METAL TUBE COATING PROCESS

BACKGROUND OF THE INVENTION

1. Field of the Invention

This invention relates to coating compositions formulated to cure by free radical mechanism useful for coating the exterior surface of cleaned and prepared metal tubing and other metal substrates and the process for achieving application and curing of the coating compositions. The tubing and other metal objects to which the invention is applicable may be comprised of cold rolled steel, hot dipped galvanized steel, electro galvanized steel, Galvalume and aluminum. More particularly this invention relates to coatings formulated to cure by free radical mechanism and which are polymerized using an electron beam generator. The electron beam generator creates energy that is absorbed through inelastic collisions between high energy electrons emanating from an acceleration chamber of the generator and the electrons associated with the components of the coating. The coating component electrons are excited or ionized and both forms can lead to initiation of radical polymerization in which the coating does not block or stick. The coating function is decorative as well as utilitarian and complies with the specific properties required depending upon the specific market and requirements of the tube or product producer.

2. Description of the Prior Art

Coatings have long been available for a wide variety of production metal tube. Coatings include those containing solvents and dry by solvent evaporation and or oxidation. Other types of coatings that have more recently come into use include, but are not limited to, water reducible, powder and radiation light curable coatings. These coatings, including water reducible, powder and light reactive coatings, have inherent limitations:

Water reducible coatings are sensitive to freezing and require energy to remove water from the film prior to curing. In some water reducible coating formulations, a coalescing solvent is present which may cause the coating to be more water sensitive. In addition, the coalescing material may be classified as a volatile organic compound, impacting air quality. Typically, metal preparation is more critical when using water reducible coatings as compared to solvent type coatings. The cleaning stages, chemicals, concentrations, temperature and dwell time vary, depending on the metal from which the tubes are composed, line speeds and conditions as well as market requirements determined by the tube or product producer.

The light radiation curable coatings have limited light emitting element, i.e., bulb life, and are sensitive to breakage and have difficulty curing opaque coatings. The light reactive coatings crosslink only to the extent that spectral radiation energy penetrates the film and activates photoinduction inducing free radical polymerization. If the light emitting element or bulb is old, dirty, or out of focus, cure of the coating composition may be significantly retarded. If the light reflector of the light radiation aparatus is allowed to become dirty or contaminated, cure of the coating composition may also be significantly retarded. Light radiation curable opaque coatings are more difficult to cure compared to clear coats and given specific colors, opacity, film thickness, available energy, or line speeds, many of such coatings cannot be cured by light radiation.

Powder coatings require higher temperatures and/or longer dwell times in order to cure the coating. The Powder coatings higher temperature requirements can cause problems with an interior tube coating such as degradation or fire. In addition the tube is more prone to bending or flexing at high temperatures while being conveyed which may result in handling or production down time problems. The high temperatures and increased energy associated with powder coatings can mean higher costs. Color changes are more critical with powder coatings because, being a powder, one color can not blend into another. When powder coatings are utilized, any contamination present on the tube or in the coating composition shows up as a separate color spot.

Metal tubes are sold into a variety of markets and products that include but are not limited to, mechanical applications, fencing, furniture (predominately outdoor furniture, liquid transmission applications and walking canes). Cleaning procedures will vary depending on the metal being processed, coating being used, cleaning chemical, metal pretreatment chemical, chemical temperatures, line speeds and processing equipment condition. Coatings used for coating tubular goods and other metal substrates are usually high or medium gloss coating formulations that provide both decorative as well as protective qualities. Film thicknesses vary from about 0.5 mil to about three mils depending on the application and market. Line speeds for tube coating processes are typically from a low of about seventy five feet per minute to as high as typically six hundred feet per minute. The tubes being coated may variety in diameter and wall thickness and are typically cut to various lengths depending on end user or customer requirements.

The methods of coating application for tubular goods may include air atomized, airless atomized and air assist-airless atomized coating application systems. These various coating application systems may also employ heated coatings and may be operated in both manual and automatic mode. Other methods are vacuum coaters, continuous coaters, flood and wipe and flow coaters. These methods may also include variations and combination such as for example heating the coating and/or employing automatic viscosity control means or other system variations currently in the public domain. In some cases both the interior and exterior of the tubes are coated. Typical tube cross-sectional tube configurations include round, square or rectangular tube stock. The coatings may consist of clears, primers, sealers or color applied directly to the prepared metal.

Conventional Tube Coating Processing

A conventional tube coating process typically consists of the following processing steps:

1. Coil entry

This step represents the introduction of coiled metal strip material into a coated metal tube production line. Typically, a coil of metal strip material is mounted for rotation and the strip material is moved endwise from the coil and conducted to tube forming apparatus.

2. Tube formation

This step represents essentially linear or endwise transfer of metal coil tubing stock into tube forming rolls where the tubing stock is formed to the desired configuration and welded.

3. Tube cleaning . . . usually heated cleaning solution

The tube is cleaned in this step and typically uses a chemical/water solution to remove the metal surface contaminates.

4. Rinse . . . water or water chemical rinsing solution combination

This step removes any excess water/chemical solution.

5. Chemical pretreatment . . . usually a heated solution

A chemical pretreatment solution is applied to react with and modify the metal surface of the tube to produce a surface suitable for painting, to enhance coating adhesion and to provide for corrosion resistance. Specific chemicals are applied for surface pretreatment, depending on the characteristics of the metal, production conditions and tube end use requirements.

6. Rinse/dry

The tube is given a rinse and is dried. It should be noted that some production lines incorporate additional cleaning and chemical pretreating steps before the tube moves to the coating application area.

7. Application of coating

The coating is typically applied by spray or vacuum coater method but other application equipment such as continuous coater, airless, air assist, air spray have been employed some using heaters to elevate the coating temperature for example.

Electrostatic equipment is the primary equipment used to apply powder coatings. Most coating systems are automatic.

8. Cure coating

Present art is practiced utilizing devices sufficient to dry or cure various types of coatings as described. They include but are not limited to: induction heating, gas fired ovens, ultra violet curing devices, such types as are available from Fusion UV Systems, Inc. located at 910 Clopper Road, Gaithersburg, Md. or Aetek Internal, Inc. a Subsidiary of Fusion UV Curing Systems. Other types of curing devices for tube coatings may include Infrared, high velocity gas or electric devices.

9. Cool on quench step may be required due to the high tube temperature that is required when a powder coating is applied to a metal substrate and cured.

10. Cut and/or band Tube

After the tubing has been properly coated, it is readied for shipment to customers by gathering finished tubing into bundles containing desired numbers of tubes and applying retainer bands to the bundles so that the tubes can be efficiently handled and shipped. A conventional coated tubing manufacturing process typically consists of the following steps:

1. Coil entry

This step represents the introduction of metal coil into the production line.

2. Tube formation

This step represents transfer of the coil into the tube forming rolls where the tube is formed and welded.

3. Cleaning the of the tube

After the tube is formed, it is cleaned and rinsed. The cleaning system typically utilizes a chemical/water solution that is heated. In most cases tanks are designed to clean the pipe utilizing a spray or flood procedure to apply the cleaner to the metal as it passes through the tank or tanks. A water rinse tank or tanks is used to assure that the cleaner residue is removed. The water rinse tank may also be heated. If the metal is not cleaned properly, paint adhesion problems will occur.

4. Rinse

This step removes any excess water/chemical cleaning solution.

5. Chemical Pretreatment

The chemical pretreatment or conversion coat step provides a protective layer to the substrate. This chemical treatment is designed to react with and modify the metal to produce a surface suitable for painting and to enhance the paint adhesion. This conversion coat also provides protection to the substrate from exterior corrosion.

6. Rinse

This step may consist of one or two rinse stages using water/chemical and or a water rinse. As the tube continues moving forward from the final rinse tank, it is dried and moves into the chemical coating section.

7. Application of paint or coating

The application of the paint or coating to the metal is accomplished by passing the tube through the paint coater. The paint coater may consist of spray, flood and wipe, vacuum or continuous coaters or other typical methods of application known to the industry. Conveyor rolls typically support the tubing as it moves through or past the coating application equipment area. Settings and conveyor speeds must be controlled for consistent application of paint film. The correct paint film will vary depending on the specification of each individual paint and product requirement. Before any liquid paint, containing volatiles is used in the paint coater, it must be properly mixed to achieve the specified application viscosity. Periodic checks and viscosity adjustments must be made to allow for changes due, for example, to solvent evaporation.

8. Curing the paint

After the paint has been applied, the continuous tube then moves directly into the drying unit, curing ovens, or light radiation unit. In the case of powder, the meltflow-cure process can occur as a result of preheating the tube to a high temperature with, for example, an induction heater after the final rinse. The curing equipment temperatures must be set at a level to achieve a peak metal tube temperature, or light radiation energy, specified by the coating supplier for a specific paint and line speed. With the proper film thickness, line speed and metal temperature, or radiation achieved, the curing step is complete.

9. Cooling or quench step. This step may be required for cooling the coated tube due to the high heat that is necessary for curing of powder coatings.

10. Cutting the tube (in line process only) and banding.

SUMMARY OF THE INVENTION

Tube Coating Process According to the Present Invention

Coating compositions, cured by free radical polymerization process, according to the present invention, are especially useful for coating the exterior surface of tubes comprised of metals such as cold rolled steel, aluminum, galvanized metal, Galvalume and hot dipped galvanized metal. Particularly such metal substrate coating compositions have unsaturated acrylate bonds, ($CH=CH2$) groups which are polymerized by free radical mechanism upon application of electron beam radiation from an electron beam generator. Those compositions are typically in liquid form with about zero volatiles as measured at 77° F. Additionally those coatings can be semi-transparent or opaque. The free radical coating polymerization process is induced by high energy electrons emanating from an acceleration chamber and causing inelastic collisions between those electrons and those associated with the components of the coating. The velocity of the electron does not determine the amount of energy delivered to the film, this quantity is controlled by the number of electrons which is a function of the beam current. Thus for a coating which requires a certain energy input to insure complete cure, line speed and beam current can be linked. This allows the delivery of the necessary dosage to the film at various line speeds. Compositions having acceptable film performance for tube coating such as adhesion, flexibility, durability, chemical resistance weatherability and hardness are described. It should also be borne in mind, though the present invention is described in detail herein, particularly as it relates to coatings for tubular goods, the coating compositions and processes of this invention have effective application for coating a wide variety of metal surfaces; thus the present invention is not intended to be limited to tubular goods. Various coating compositions of the type described in this specification are used in conjunction with an electron beam unit or units to polymerize the film. Those skilled in art will appreciate that modifications may be made to the invention without departing from the spirit and scope thereof Therefore, it is not intended that the scope of the invention be limited to the specific compositions described. Both clear and pigmented coatings of various gloss levels are described in this invention. The coating formulation components of the present invention include monomers and oligomers, having the capability of being cured by electron beam and may include, but the coating formulation may include, but is not limited to, cure additives, adhesion promoters, color pigments or dyes, gloss reduction additives, wetting agents and flow or dispersing aids, such as, but not limited to UCB 169 methacrylate for adhesion, Monsanto Modaflow for flow and leveling—OSI L7500 for wetting and oxygen scavengers, i.e., tertiary amines, for cure. The tube coating process may be the continuous painting of the tube exterior surface or it may be an "off line" process of coating individually cut sections of tube.

An improved process for coating of metal tube utilizing electron beam generating equipment to cure a coating or coatings by free radical mechanism involves the following processing steps:

Process Steps
1. Coil entry
2. Tube formation
3. Cleaning of the tube
4. Rinse
5. Chemical pretreatment
6. Rinse
7. Application of the coating composition type as described in this specification
8. Cure or polymerization of the coating by electron beam equipment
9. Cutting of the tube (In line process) and or banding
Additional cleaning or pretreatment steps may be added to include a sealer or deionized water rinse as may be required.

1. A reduction in the amount of energy needed to dry, flow or cure as compared to the requirements for powder coatings, water reducible or light radiation cured coatings.

2. The ability to cure opaque coatings of the type described in this invention, especially with film thicknesses over 0.8 mils, using electron beam equipment with a nitrogen blanket, as compared to light radiation curing equipment.

3. The replacement of Induction heating units and powder coating with electron beam generators and compositions of the type described in this invention will result in tube metal temperature reduction. The lower temperatures will reduce or eliminate fires or fumes from the degradation of any interior tube coating, where previous existence was noted and or tube flexing associated with the high temperatures sometimes required with powder coating.

4. The reduction of tube metal temperatures will reduce or eliminate tube flexing or bending that are occasionally associated with the high metal temperatures generated by induction heaters and necessary to cure powder coatings. The typical line speeds encountered with tube lines provide a very short dwell time to melt, flow and cure Powder coatings, as a result the peak metal temperatures must be high. Tube flexing or bending can impair production or require more or special tube guides or rollers. A water quench step may be needed in order to reduce the tube temperature in a rapid manner on short production lines.

5. Higher coating transfer efficiency as compared to powder coating when film thickness requirements are from about 0.4 to about 0.7 for example.

6. Reduced maintenance costs of equipment associated with Light radiation coatings, powder coatings and water reducible coatings. Lamps or bulbs are required in light radiation equipment and are subject to periodic replacement depending on the type of bulb operating conditions. Split seams that frequently occur with in line tube processing can cause the tubing to flex to the extent that bulbs become damaged or broken. Some type bulbs are more prone to suffer from energy output degradation after time and must be replaced especially if not properly cooled or allowed to become contaminated. Electron beam equipment does not rely on bulbs to generate polymerization energy and is not subject to the inherent problems associated with bulbs. The Electron beam equipment also does not require a "focused" energy point as does an Ultraviolet curing system. Powder coating applications typically use electrostatic equipment cables, collectors, filters and spray guns that require replacement parts typically much more expensive than automatic air spray guns which can apply the coatings described in this invention. Powder is abrasive and tends to degrade surfaces it is in contact with such as nozzles for example. Water reducible coatings are subject to water evaporation and if the coating is allowed to coalesce or dry on the coating equipment extensive cleaning time can be required. If the build up is allowed to accumulate it may result in replacement of the equipment.

7. Problems associated with powder coating the tube at elevated temperatures such as, for example, the need for additional cooling time, space and for a conveyor can be eliminated by practicing this invention.

8. Ability to cure or polymerize semi-transparent coatings more completely as compared with Light radiation curing equipment at high tube production line speeds.

With the foregoing description of the invention, those skilled in the art will appreciate that modifications may be made to the invention without departing from the spirit thereof Therefore, it is not intended that the scope of the invention be limited to the specific embodiments illustrated and described.

EXAMPLE I

A coating composition as follows with application on cleaned and pretreated tube metal as follows:

1. Gloss Clear Coating

A difunctional unsaturated Acrylate aliphatic urethane oligimer having a molecular weight from about 1200 to 10,000 and comprised of weight percentages as follows, from about 30 percent to about 70 percent. A difunctional aliphatic urethane unsaturated Acrylate oligimer having a molecular from about 1200 to 10,000 and comprising weight percentages as follows, from about 5 percent to 40 percent. A monofunction aliphatic unsaturated Acrylate monomer having a molecular weight from about 130 to about 600 and comprising by weight an amount from about 5 to 40 percent. Additives are included for enhancing adhesion, flow, leveling or other film properties, and have as a combined weight percentage, not more than 15 percent.

The Gloss Clear Coating when applied to cleaned and pretreated aluminum and galvanized tube metal panels, by means of a 0.0015 Bird wet film applicator, generated a film thickness of about 0.9 mils. The panels coated with the above formulation were exposed to electrons generated from an Advanced Electron Beams, Inc. unit model EB lab-100 with nitrogen blanket. This unit is rated at 100 KV and 10 milliamps. Exposure to the electron environment was less than 6 seconds and the coated panel removed. The panels with the cured film were allowed to "age" for 15 minutes and then bent to a 1T bend. A 1T bend is a 180 degree bend with a radius of combined metal thickness of three. Scotch #600 tape was applied to bend radius and removed. The tape showed no film removal. The bent films were then checked using a solution of copper sulfate to further check for any evidence of coating fracture or removal. No evidence of film removal or fractures was observed. The ASTM cross hatch method indicated adhesion results to be 100%. Direct impact testing exceeded 120 inch lbs. Reverse impact testing was done at 2 times metal thickness. The deformed area showed no pick off and no coating removal when #600 tape was applied to the deformed area and removed. The paint film pencil hardness was an "H" using an Eagle Turquoise pencil. MEK rubs exceeded 200 total and were made using wetted cheese cloth and applied with the index finger as is typically done in the coil coating industry.

The film properties of the Gloss Clear Coat as described meet the typical film properties required for a tube coating.

EXAMPLE II

A coating composition as follows, is provided for application on cleaned and pretreated tube metal panels as follows:

2. Gloss Black Coating

A difunctional unsaturated Acrylate aliphatic urethane oligimer having a molecular weight from about 1200 to 10,000 and comprised of weight percentages as follows, from about 30 percent to about 70 percent. A difunctional unsaturated Acrylate aliphatic urethane oligimer having a molecular weight from about 1200 to 10,000 and comprised of weight percentages as follows, from about 5 to 40 percent. A mono functional unsaturated acrylic monomer and having a molecular weight of from 130 to 600 and comprising by weight an amount from 5 to 40 percent. Additives including but not limited to for enhancing leveling, flow, cure, adhesion or other film properties not to exceed 20 percent. Carbon black pigment not to exceed 20 percent by weight. The carbon black to be milled to yield a micron size not exceeding about 20 microns.

The gloss black coating was cured using an Advanced Electron Beams, Inc. lab unit adjusted to full power output and incorporating a nitrogen blanket. The unit is designated EB-100 and has a power output of about 100 kilovolts and 10 milliamps. Cleaned and pretreated panels of both steel and Galvalume tube sheet stock were coated with the gloss black described. The application method was completed using a Bird 0.0015 applicator bar. The gloss black coated panel was exposed to the electron environment of not more than 8 seconds. No noticeable heat was generated and the film of about 0.8 mils was tested after 15 minutes for the following:

Gloss . . . 89 percent plus

Pencil hardness . . . H with an Eagle Turquoise pencil

Cure . . . 119 MEK double rubs as prescribed in the quality control procedures

Reverse impact . . . 2 times metal thickness, the deformed area showed no pick off when tested with Scotch #600 tape.

Cross hatch adhesion . . . no pick off was observed using the Scotch #600 tape procedure.

T-bend . . . 2T results were obtained using the prescribed Quality Control Procedures.

The gloss black test results meet or exceeded the tube coating industry standards.

EXAMPLE III

A coating composition is provided for application on cleaned and pretreated tube metal panels as follows:

3. Off White Medium Gloss Coating

A difunctional unsaturated acrylic aliphatic urethane oligimer having a molecular weight from 1200 to 10,000 and comprising from 30 percent to 70 percent by weight. A difunctional unsaturated acrylic aliphatic urethane oligimer having a molecular weight from 1200 to 10,000 and comprising from 4 to 16 percent by weight. A monofunctional unsaturated acrylic monomer having a molecular weight of from 130 to 600 and comprising from 15 to 40 percent by weight. A difunctional aliphatic monomer having a molecular weight from 160 to 800 may be added up to a 20 percent amount by weight. Titanium Dioxide pigment from 5 to 30 percent by weight. Carbon Black pigment from 0.2 to 10 percent and Yellow oxide pigment from 0.5 to 15 percent. Zinc Stearate up to about 20 percent by weight. Additives for flow, leveling, color uniformity, adhesion, cure and mar resistance may be added up to 15 percent by weight. The pigments milled or dispersed to yield a particle size of a maximum of micron size of 20.

The coating was applied to cleaned and pretreated tube sheet stock panels having a temperature from about 95 degrees to about 130 degrees F. Application was by Bird applicator and a film thickness of about 0.9 was obtained. The coated panels were then cured using an American Electron Beam, Inc. unit model EB lab-100, with a nitrogen blanket and having a power output of 100 KV and 10 milliamps. Exposure to the electron environment was less than 8 seconds and the coated panel was removed. The coated panels were tested for the following properties:

Metal . . . Aluminum and Galvanized

Gloss . . . about 32 percent to about 38 percent

Film thickness . . . panel #1 (Aluminum) about 0.6 mil and panel #2 (Galvanized) about 2.4 mils Hardness . . . Eagle turquoise pencil greater than "F" to less than "2H"

Reverse Impact . . . 2 times metal thickness with no pick off using Scotch #600 tape T bend . . . 2T Adhesion . . . no pick off on cross hatch using Scotch #600 tape MEK . . . 106 double rubs using MEK and cheese cloth per Coil Coaters specification The above film properties meet the requirements for tube coatings.

EXAMPLE IV

A coating composition is provided for application on cleaned and pretreated tube metal panels as follows, 4. Simulated Metallic Silver Coating A difunctional unsaturated acrylic aliphatic urethane oligimer having a molecular weight from 1200 to 10,000 and comprising from 30 to 70 percent by weight. A difunctional unsaturated acrylic aliphatic oligimer having a molecular weight from 1200 to 10,000 and comprising from 5 to 50 percent by weight. Treated mica pigments or combinations of pigments up to about a maximum level of 40 percent by weight. A monofunctional unsaturated acrylic monomer having a molecular weight from about 130 to 600 and comprising from about 5 to 50 percent by weight. Additives for, but not limited to: cure, adhesion, flow, wetting and leveling not to exceed about 20 percent by weight.

Panels of cleaned and pretreated hot dipped galvanized and aluminum tube stock were coated with the above formulation using a Bird film applicator. Panels were exposed to electron beams using an American Electron Beam, Inc. unit, model EB lab-100 with nitrogen blanket and having a power output of 100 KV and 10 milliamps.

Exposure was less than 6 seconds and the cured film was tested for the following:

Film thickness . . . . . . 5 to 0.7 mil

Gloss . . . 37 percent

Hardness . . . "H"

Cure . . . . 117 MEK double rubs using the approved procedure

Reverse impact . . . . 2 times metal thickness with no pick off using Scotch * 600 tape Adhesion . . . . No pick off with Scotch #600 tape The coating film properties exhibited meet the prescribed requirements.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. A method for applying a coating to a metal tube, comprising:
   (a) preparing a metal tube for coating;
   (b) applying a coating composition to the metal tube;
   (c) causing free radical polymerization of said coating composition by subjecting the metal tube with the coating composition thereon to an electron beam emanating from an acceleration chamber of an electron beam generator.

2. The method of claim 1, wherein said step of applying a coating composition to a tube comprising:
   applying to the metal tube a substantially clear gloss coating composition having a difunctional unsaturated acrylate aliphatic uretahane oligimer, a difunctional aliphatic urethane unsaturated acrylate oligimer and a monofunctional aliphatic unsaturated acrylate monomer.

3. The method of claim 1, wherein said step of applying a coating composition to a tube comprising:
   applying to the metal tube a substantially clear gloss coating composition having a difunctional unsaturated acrylate aliphatic urethane oligimer having a molecular weight from about 1200 to about 10,000 and comprised of weight percentages of from about 30% to about 70%, a difunctional aliphatic urethane unsaturated acrylate oligimer having a molecular weight from about 1200 to about 10,000 and having weight percentages from about 5% to about 40% and a monofunctional aliphatic unsaturated acrylate monomer having a molecular weight from about 130 to about 600 and comprising by weight from about 5% to about 40% of said coating composition.

4. The method of claim 3, comprising:
   applying to the metal tube a substantially clear gloss coating composition having a difunctional unsaturated acrylate aliphatic urethane oligimer having a molecular weight from about 1200 to about 10,000 and comprised of weight percentages of from about 30% to about 70%, a difunctional aliphatic urethane unsaturated acrylate oligimer having a molecular weight from about 1200 to about 10,000 and having weight percentages from about 5% to about 40%, a monofunctional aliphatic unsaturated acrylate monomer having a molecular weight from about 130 to about 600 and comprising by weight from about 5% to about 40% of said coating composition and additives for cure, adhesion, flow, wetting and leveling up to about 15% by weight.

5. The method of claim 1, wherein said step of applying a coating composition to a tube comprising:
   applying to the met al tube a gloss black coating composition having a difunctional unsaturated acrylate aliphatic urethane oligimer, a difunctional unsaturated acrylate aliphatic urethane oligimer, a monofunctional unsaturated acrylic monomer and carbon black pigment not exceeding about 20% by weight and having a micron size not exceeding about 20 microns.

6. The method of claim 1, wherein said step of applying a coating composition to a tube comprising:
   applying to the metal tube a gloss black coating composition having a difunctional unsaturated acrylate aliphatic urethane oligimer having a molecular weight from about 1200 to about 10,000 and comprised of weight percentages of from about 30% to about 70%, a difunctional unsaturated acrylate aliphatic urethane oligimer having a molecular weight from about 1200 to about 10,000 and having weight percentages from about 5% to about 40% and a monofunctional unsaturated acrylic monomer having a molecular weight from about 130 to about 320 and comprising by weight from about 5% to about 40% of said coating composition and carbon black pigment not exceeding about 20% by weight and having a micron size not exceeding about 20 microns.

7. The method of claim 1, wherein said step of applying a coating composition to a tube comprising:
   applying to the metal tube a gloss black coating composition having a difunctional unsaturated acrylate aliphatic urethane oligimer having a molecular weight from about 1200 to about 10,000 and comprised of weight percentages of from about 30% to about 70%, a difunctional unsaturated acrylate aliphatic urethane oligimer having a molecular weight from about 1200 to about 10,000 and having weight percentages from about 5% to about 40% and a monofunctional unsaturated acrylic monomer having a molecular weight from about 130 to about 600 and comprising by weight from about 5% to about 40% of said coating composition, carbon black pigment not exceeding 20% by weight and having a micron size not exceeding about 20 microns and additives as may be required for cure, adhesion, flow, wetting and leveling up to about 15% by weight.

8. The method of claim 1, wherein said step of applying a coating composition to a tube comprising:

applying to the metal tube an off-white medium gloss coating composition having a difunctional unsaturated acrylic aliphatic urethane oligimer, a difunctional unsaturated acrylic aliphatic urethane oligimer, a monofunctional unsaturated acrylic monomer, titanium dioxide pigment from about 5% to about 30% by weight, carbon black pigment from about 0.2% to about 10% by weight, yellow oxide pigment from about 0.5% to about 15% by weight, zinc stearate pigment up to about 20% by weight, said titanium dioxide pigment and said zinc stearate pigment being milled or dispersed to yield a particle size having a maximum of about 20 microns.

9. The method of claim 1, wherein said step of applying a coating composition to a tube comprising:

(a) applying to the metal tube an off-white medium gloss coating composition having a difunctional unsaturated acrylic aliphatic urethane oligimer having a molecular weight from about 1200 to about 10,000 and comprised of weight percentages of from about 30% to about 70%, a difunctional unsaturated acrylic aliphatic urethane oligimer having a molecular weight from about 1200 to about 10,000 and having weight percentages from about 4% to about 30% and a monofunctional unsaturated acrylic monomer having a molecular weight from about 130 to about 600 and comprising by weight from about 15% to about 40% of said coating composition, a difunctional aliphatic monomer having a molecular weight of from about 160 to about 800 having a weight percentage up to about 15%, titanium dioxide pigment from about 5% to about 30% by weight, carbon black pigment from about 0.2% to about 10% by weight, yellow oxide pigment from about 0.5% to about 15% by weight, zinc stearate pigment up to about 20% by weight, said titanium dioxide pigment and said zinc stearate pigment being milled or dispersed to yield a particle size having a maximum of about 20 microns; and (b) exposing said off-white medium gloss coating to said electron beam of an electron beam generator having a power output of about 100 KV and about 10 milliamps for a period having a maximum of about 8 seconds.

10. The method of claim 1, wherein said step of applying a coating composition to a tube comprising:

applying to the metal tube an off-white medium gloss coating composition having a difunctional unsaturated acrylic aliphatic urethane oligimer having a molecular weight from about 1200 to about 10,000 and comprised of weight percentages of from about 30% to about 70%, a difunctional unsaturated acrylic aliphatic urethane oligimer having a molecular weight from about 1200 to about 10,000 and having weight percentages from about 4% to about 30% and a monofunctional unsaturated acrylic monomer having a molecular weight from about 130 to about 600 and comprising by weight from about 15% to about 40% of said coating composition, a difunctional aliphatic monomer having a molecular weight of from about 160 to about 800 having a weight percentage up to about 20%, titanium dioxide pigment from about 5% to about 30% by weight, titanium dioxide pigment from about 5% to about 30% by weight, carbon black pigment from about 0.2% to about 10% by weight, yellow oxide pigment from about 0.5% to about 15% by weight, zinc stearate pigment up to about 20% by weight, said titanium dioxide pigment and said zinc stearate pigment being milled or dispersed to yield a particle size having a maximum of about 20 microns, and additives for cure, adhesion, flow, wetting and leveling up to about 15% by weight.

11. The method of claim 1, wherein said step of applying a coating composition to a tube comprising:

applying to the metal tube a metallic silver coating composition having a difunctional unsaturated acrylic aliphatic urethane oligimer, a difunctional unsaturated acrylic aliphatic oligimer, a monofunctional unsaturated acrylic monomer and treated mica pigment up to about 40% by weight.

12. The method of claim 1, wherein said step of applying a coating composition to a tube comprising:

applying to the metal tube a metallic silver coating composition having a difunctional unsaturated acrylic aliphatic urethane oligimer having a molecular weight from about 1200 to about 10,000 and comprised of weight percentages of from about 30% to about 70%, a difunctional unsaturated acrylic aliphatic oligimer having a molecular weight from about 1200 to about 10,000 and having weight percentages from about 5% to about 50%, a monofunctional unsaturated acrylic monomer having a molecular weight from about 130 to about 600 and comprising by weight from about 5% to about 50% of said coating composition and treated mica pigment up to about 40% by weight.

13. The method of claim 1, wherein said step of applying a coating composition to a tube comprising:

applying to the metal tube a metallic silver coating composition having a difunctional unsaturated acrylic aliphatic urethane oligimer having a molecular weight from about 1200 to about 10,000 and comprised of weight percentages of from about 30% to about 70%, a difunctional unsaturated acrylic aliphatic oligimer having a molecular weight from about 1200 to about 10,000 and having weight percentages from about 5% to about 50%, a monofunctional unsaturated acrylic monomer having a molecular weight from about 130 to about 600 and comprising by weight from about 5% to about 50% of said coating composition, treated mica pigment up to about 40% by weight and additives for cure, adhesion, flow, wetting and leveling up to about 20% of said coating composition by weight.

* * * * *